Figures 1, 2:
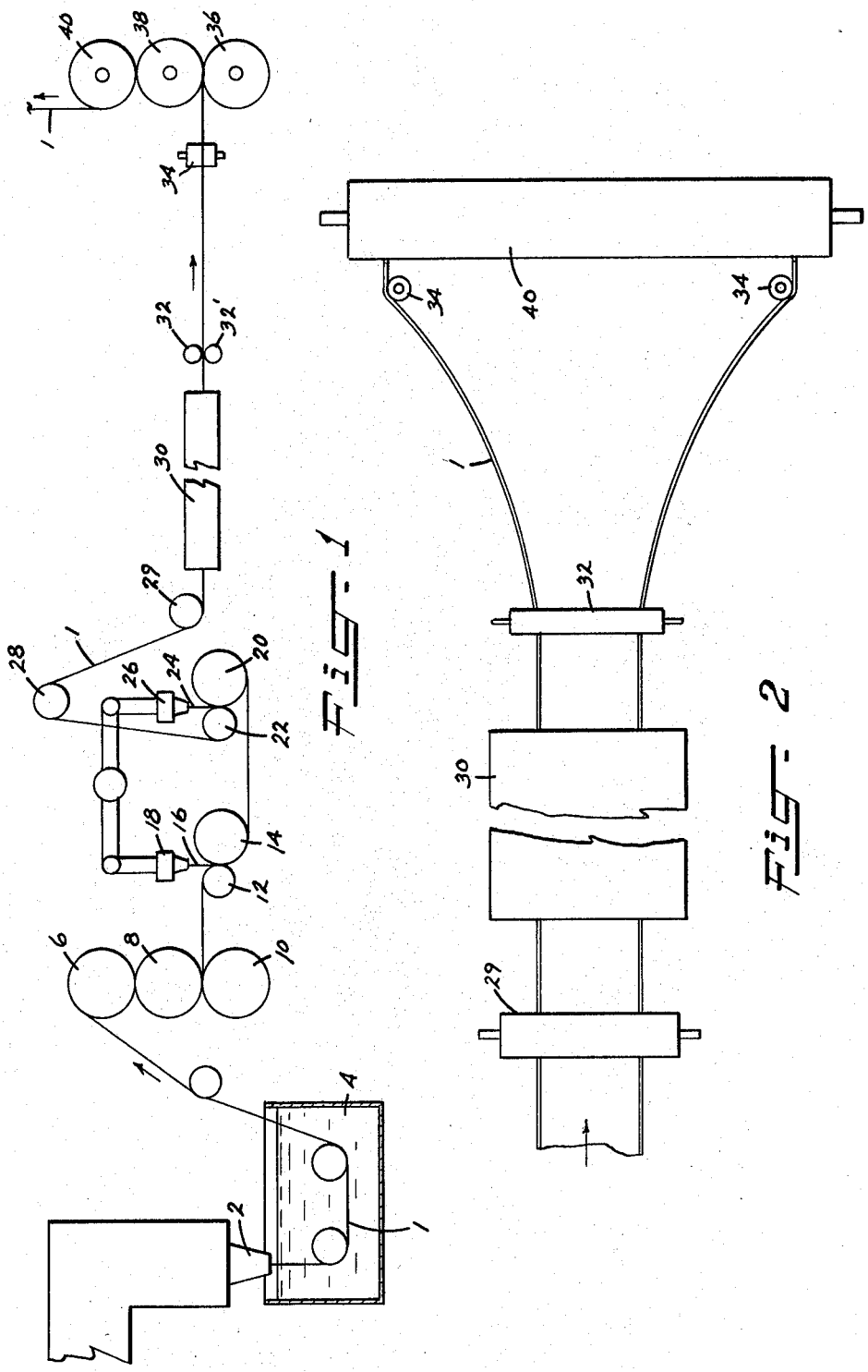

Nov. 15, 1966   E. BARKIS ETAL   3,285,766
BIAXIALLY ORIENTED ETHYLENE POLYMER COATED POLYPROPYLENE
SHEET AND METHOD FOR MAKING SAME
Filed March 28, 1963

United States Patent Office 3,285,766
Patented Nov. 15, 1966

3,285,766
BIAXIALLY ORIENTED ETHYLENE POLYMER COATED POLYPROPYLENE SHEET AND METHOD FOR MAKING SAME
Edward Barkis, Philadelphia, Pa., and James C. Chu, Wilmington, Del., assignors to Avisun Corporation, Philadelphia, Pa., a corporation of Delaware
Filed Mar. 28, 1963, Ser. No. 268,622
8 Claims. (Cl. 117—7)

This invention relates to a method for preparing a heat-shrinkable, heat-sealable, biaxially oriented composite sheet of isotactic polypropylene film and a clear firmly-adhering coating of a polymer of ethylene, and the product formed thereby. Biaxially oriented polypropylene film will not heat-seal at temperatures in the range for sealing conventional heat-sealable cellophane. At temperatures high enough to effect a seal puckering occurs as the film attempts to shrink to its former unoriented dimensions, thus providing an unattractive and commercially unaccepable joint.

In order to remedy this situation it has been proposed to coat or laminate the oriented polypropylene film with film-forming resins which will seal at lower temperatures than the base sheet. While this proposal has some merit, a practical method has not been found to satisfactorily adhere a polyolefin coating to the oriented base sheet without the use of special and costly adhesives.

It is an object of this invention to provide a method for preparing a heat-shrinkable, heat-sealable, biaxially oriented composite sheet of an isotatic polypropylene base film.

It is another object of this invention to provide a relatively inexpensive method for preparing a biaxially oriented composite sheet of isotactic polypropylene having a strongly adhering coating of polyethylene on at least one side thereof without the use of an intermediate adhesive.

It is a further object of this invention to provide a heat-shrinkable, heat-sealable, moisture-impermeable composite sheet of an isotatic polypropylene base film coated on at least one side with a polymer of at least 65% ethylene.

The accompanying drawing schematically depicts the method of this invention in which FIG. 1 is a side view of a preferred form of apparatus used to prepare the biaxially oriented composite film, and;

FIG. 2 is a top view of the biaxial stretching section of said apparatus.

The above objects and others are accomplished in accordance with this invention and the accompanying drawing by melt extruding onto at least one side of a traveling web of unoriented isotactic polypropylene a coating of a film-forming resinous polymer of ethylene, heating the composite sheet to a range between about 20 and about 40° C. below the crystalline melting point of the polypropylene web, stretching the composite sheet to at least 3 times its dimensions in each of two mutually perpendicular directions while heated to a temperature within said range, and then cooling the biaxially oriented composite sheet while holding it under sufficient tension to prevent any substantial change in its dimensions.

The isotactic polypropylene before orientation may be further broadly characterized in that it has an average molecular weight of from at least 50,000 to 500,000 and higher, a density of from .88 to 0.94 g./cc., and a melt index of from about 0.5 to about 10.0. Preferably, the polypropylene resin has an average molecular weight of between about 100,000 and 200,000, a density of from about 0.90 to 0.92 g./cc., and a melt index of from about 1 to 10.

The film-forming orientable coating poylmer of ethylene is either the resinous homopolymer of ethylene or a resinous copolymer of at least 65% of ethylene and a monomer copolymerizable therewith, said monomers including, for example, vinyl acetate and lower alkyl acrylates. Preferred coating polymers are medium density polyethylene and a copolymer of from 65 to 75 wt. percent thylene and 35 to 25% vinyl acetate.

Small proportions of film additives may be incorporated in the polymeric coating prior to extrusion to modify or improve the surface characteristics thereof. Slip and/or antiblocking agents, e.g., organic amides, fatty acid amides, etc., may be advantageously incorporated in the polymeric coating.

The invention will be more particularly described with reference to the accompanying drawing. In FIG 1, a 6-inch wide beaded edge, isotatic polypropylene film 1 is extruded at a temperature of 260° C. through die aperture 2 into quench tank 4 which contains water maintained at a temperature of about 10° C. The film was pulled through and from the bath without appreciable stretching by driven rolls 6, 8 and 10 and then run through the nip of rubber backing roll 12 and internally chilled aluminum roll 14. As the polypropylene film 1 proceeds through the nip of these rolls, a molten film 16 of intermediate (0.930 g./cc.) density polyethylene is extruded at a temperature of about 180° C. from die 18 into the nip and onto the traveling web of polypropylene. From this coating station the one side coated web 1 proceeds around aluminum chill roll 20 and into the nip between roll 20 and rubber backing roll 22. As the web passes through this nip a molten film 24 of polyethylene is extruded from die 26 into the nip and onto the uncoated side of the web 1. If a one-side-coated composite sheet is desired, the second coating station may be eliminated from the apparatus, or die 26 may be made inoperative.

The coated web 1 travels from the coating station over idler rollers 28 and 29 to heating zone 30. The temperature in the heating zone is sufficient to heat the web to between about 20 and 40° C. below the crystalline melting point of the polypropylene. The temperature in the heating zone is maintained at about 230° C. This temperature is also about 10 to 30° C. above the melting point of the polyethylene coating.

The coated web 1 emerges from the heating zone 30 through driven nip rolls 32 and 32'. The composite sheet 1 is then simultaneously biaxially oriented to at least 3 times its dimensions in both the machine and transverse directions under the influence of horizontal rotating disks 34 which engage the beaded edges of web 1, and pull rolls 36, 38 and 40. The chilled stainless steel pull rolls 36 and 38 rotate at a faster rate than nip rolls 32 and thereby cause a simultaneous widening and lengthening of the composite sheet. After leaving the pull rolls the sheet is further processed to remove the beaded edge and then wound up.

Typical film characteristics for the heat-sealable, heat-shrinkable, two-side-coated film manufactured as described above are as follows:

TABLE

| Thickness, mil. | | Impact, Spencer/mil. | Tensile, kg./cm.² | |
|---|---|---|---|---|
| Base | Coating | | M.D.[1] | T.D.[1] |
| 0.5 | <0./0 | 2,389 | 1,050 | 1,550 |
| Slip, Instron Static, g. | | Heat Seal, g./2 in., 102° C. | MNTR[2] g./100 in.²/mil./24 hrs. | |
| 0.20 | | 420 | 0.30 | |
| Haze, Percent | | Tear | Tape Test, Percent | |
| | | M.D.[1] T.D.[1] | M.D.[1] | T.D.[1] |
| 4.0 | | 6.0    6.0 | 0.0 | 0.0 |

[1] Machine Direction and Transverse Direction.
[2] Moisture Vapor Transmission Rate.

The procedures for testing the various characteristics of the above table are well known and need no further explanation. In general, these data indicate an excellent packaging film.

The heat-sealable, heat-shrinkable composite film of this invention is useful for wrapping uneven or oddly shaped items such as poultry or meat cuts. It can be also used for wrapping bakery goods such as bread, buns and cake, and presents an attractive, more easily merchandised package. The film is moistureproof, extremely tough, and relatively inexpensive.

Various changes and modifications may be made practicing the invention without departing from the spirit and scope thereof and, therefore, the invention is not to be limited except as defined in the appended claims.

We claim:

1. A method of preparing a heat-sealable, biaxially oriented composite sheet which comprises melt extruding a coating consisting essentially of a resinous film-forming polymer of at least 65% of ethylene onto at least one side of an extruded sheet of isotactic polypropylene, heating the coated sheet to a temperature in the range of from about 20 to about 40° C. below the crystalline melting point of the polypropylene sheet, stretching the composite sheet at said temperature to at least three times its original dimensions in each of two mutually perpendicular directions, and then cooling the biaxially oriented composite sheet while restraining it to substantially its stretched dimensions.

2. The method of claim 1 wherein the coating is an ethylene homopolymer.

3. The method of claim 1 wherein the coating is a copolymer of about 65 to about 75% by weight of ethylene and about 35 to about 25% by weight of vinyl acetate.

4. The method of claim 1 wherein both sides of the polypropylene sheet are coated.

5. A heat-sealable composite sheet comprising a biaxially oriented isotactic polypropylene base sheet, and a coating on at least one side thereof consisting essentially of a resinous film-forming polymer of at least 65% by weight of ethylene firmly adhering directly to said base sheet, said base sheet having been biaxially oriented with the coating thereon.

6. The composite sheet of claim 5 wherein the coating is a homopolymer of ethylene.

7. The composite sheet of claim 5 wherein the coating is a polymer of 65–75% by weight of ethylene and 35–25% vinyl acetate.

8. The composite sheet of claim 5 wherein both sides of the base sheet are coated.

References Cited by the Examiner

UNITED STATES PATENTS

| | | | |
|---|---|---|---|
| 2,403,465 | 7/1946 | Pease | 117—161 |
| 2,485,248 | 10/1949 | Watson et al. | 117—161 X |
| 2,932,323 | 4/1960 | Aries | 138—137 |
| 3,033,707 | 5/1962 | Lacy et al. | 117—76 |
| 3,058,863 | 10/1962 | Gaines et al. | 156—244 X |
| 3,068,516 | 12/1962 | Hofer | 117—138.8 X |
| 3,144,430 | 8/1964 | Schaffhausen | 117—122 X |
| 3,202,528 | 10/1965 | James | 117—138.8 X |

FOREIGN PATENTS

| | | |
|---|---|---|
| 871,183 | 6/1961 | Great Britain. |
| 920,078 | 3/1963 | Great Britain. |

OTHER REFERENCES

Kresser, T.O.J. Polypropylene. Reinhold Publishing Corp., New York, 1960, p. 258 relied on.

U.S. Industrial Chemicals Co. Heat Seal Characteristics of Polyethylene Films and Coated Substrates. Second edition, 1959. 99 Park Avenue, New York (pages 4 and 5 relied on).

WILLIAM D. MARTIN, *Primary Examiner.*

H. HUSACK, *Assistant Examiner.*